United States Patent
Greene

(10) Patent No.: US 7,262,712 B2
(45) Date of Patent: Aug. 28, 2007

(54) HELICOPTER TACTILE EXCEEDANCE WARNING SYSTEM

(75) Inventor: Randall A. Greene, White Plains, NY (US)

(73) Assignee: Safe Flight Instrument Corporation, White Plains, NY (US)

( * ) Notice: Subject to any disclaimer, the term of this patent is extended or adjusted under 35 U.S.C. 154(b) by 81 days.

(21) Appl. No.: 10/821,974

(22) Filed: Apr. 12, 2004

(65) Prior Publication Data

US 2005/0225456 A1 Oct. 13, 2005

(51) Int. Cl.
*G08B 23/00* (2006.01)

(52) U.S. Cl. .................. 340/965; 340/407.1; 73/117.2; 701/132

(58) Field of Classification Search ................. 340/946
See application file for complete search history.

(56) References Cited

U.S. PATENT DOCUMENTS

| 2,819,838 | A | | 1/1958 | Warner |
| 3,145,915 | A | | 8/1964 | Marchal et al. |
| 3,775,745 | A | | 11/1973 | Kelley |
| 3,799,695 | A | | 3/1974 | Yamakawa |
| 4,114,442 | A | * | 9/1978 | Pratt .......................... 702/130 |
| 4,115,755 | A | | 9/1978 | Cotton |
| 4,420,808 | A | | 12/1983 | Diamond et al. |
| 4,575,803 | A | * | 3/1986 | Moore .......................... 702/132 |
| 4,619,110 | A | * | 10/1986 | Moore ...................... 60/39.091 |
| 4,787,053 | A | * | 11/1988 | Moore .......................... 340/945 |
| 4,908,618 | A | * | 3/1990 | Baker et al. ................. 340/945 |
| 5,101,619 | A | | 4/1992 | Morris et al. |
| 5,463,873 | A | | 11/1995 | Early et al. |
| 5,479,350 | A | * | 12/1995 | Barakchi et al. ............ 340/945 |
| 5,552,711 | A | * | 9/1996 | Deegan et al. .............. 340/629 |
| 5,930,990 | A | | 8/1999 | Zachery et al. |
| 5,986,582 | A | | 11/1999 | Greene et al. |
| 6,002,348 | A | | 12/1999 | Greene et al. |
| 6,002,349 | A | * | 12/1999 | Greene et al. .............. 340/965 |
| 6,216,443 | B1 | | 4/2001 | Utamura |
| 6,260,350 | B1 | | 7/2001 | Horii et al. |
| 6,321,526 | B1 | | 11/2001 | Hamana |
| 6,378,285 | B1 | | 4/2002 | Blatter et al. |
| 6,422,023 | B1 | | 7/2002 | Dudd, Jr. et al. |
| 6,772,085 | B2 | * | 8/2004 | Watkins et al. ............. 702/130 |
| 2003/0094539 | A1 | | 5/2003 | Schaeffer et al. |

FOREIGN PATENT DOCUMENTS

WO WO 2003/081554 10/2003

\* cited by examiner

*Primary Examiner*—Benjamin C. Lee
*Assistant Examiner*—Eric M. Blount
(74) *Attorney, Agent, or Firm*—Lowe Hauptman & Berner, LLP

(57) ABSTRACT

A helicopter tactile accedence warning system includes a control stick and a tactile warning device attached to the control stick. A computer or micro processor and a keyboard for entering a safe temperature profile are also provided as well as a thermocouple for measuring the turbine output temperature. The computer compares the actual temperature versus the safe temperature profile and generates a signal to activate the tactile warning device when the actual temperature falls outside of the safe temperature profile to warn a pilot to abort the start. The tactile warning device is also activated during flight operations when an over stress condition occurs to thereby warn the pilot to take corrective action. In addition, the tactile warning may be activated at a first frequency as an early warning and then at a second frequency as an indication of imminent danger.

1 Claim, 5 Drawing Sheets

HELICOPTER TACTILE EXCEEDANCE WARNING SYSTEM

FIELD OF THE INVENTION

This invention relates to an exceedance or over stress warning system for helicopters and more particularly to a tactile warning system for avoiding "hot-starts" and other unsafe operating conditions.

BACKGROUND FOR THE INVENTION

Helicopters of the type having turbine engines typically include turbine outlet temperature sensors and/or monitors to avoid "hot-starts". It is well recognized that during the first few seconds of a start, the turbine outlet temperature will accelerate at a fairly rapid rate and should be closely monitored. For example, with respect to one type of engine, a pilot should abort the start if either a 927° C. maximum or 810° C. to 927° C. maximum ten second transient limitation is about to be exceeded.

A method for correcting a "hot-start" condition is disclosed in a U.S. patent of Morris et al. U.S. Pat. No. 5,101,619. As disclosed therein a method for correcting a "hot-start" condition in a gas turbine engine without requiring a complete shutdown and re-initiation of the startup sequence, includes temporarily interrupting the flow of fuel to the engine for a brief period of time following detection of an impending "hot-start" condition.

A further approach to avoid "hot-starts" is disclosed in a U.S. Pat. No. 6,357,219 of Dudd, Jr. et al. As disclosed therein, a turbine engine fuel delivery system has, a fuel bypass for diverting fuel exiting a fuel control away from the engine and back to the fuel pump to maintain a relatively constant pressure differential across the fuel control. A separate controllable flow fuel bypass is provided for selectively diverting fuel exiting the fuel control away from the engine and back to the fuel pump to decrease the rate of fuel flow to the engine and correct an over temperature condition. The fuel delivery system also includes an arrangement for enabling the controllable fuel bypass during engine startup and disabling the controllable fuel bypass when the engine reaches normal idle speed.

Pilot warning systems which provide a tactile warning to the pilot during flight operations are also known. For example, my earlier patent of Greene et al. U.S. Pat. No. 6,002,349 discloses a helicopter anti-torque limit warning device. As disclosed therein, the pilot warning system acts on foot pedals which are operatively connected to the controllable force mechanism. The pedal movement controls the amount of force exerted by the controllable force mechanism on the tail boom to control the orientation of the helicopter about the yaw axis. A position sensing device senses the location of at least one of the foot pedals between its first and second position, and a warning indicator operatively connected to the position sensing device provides a warning to the pilot when the sensed foot pedal reaches a predetermined distance from one of the first and second positions. The warning indicator provides a tactile warning such as vibration or shaking of the respective foot pedal to provide an unmistakable warning to the pilot that the foot pedal has reached a predetermined position near its maximum travel position.

Notwithstanding the above, it is presently believed that there is a present need and a large potential commercial market for an improved over stress warning system for avoiding "hot-starts" in accordance with the present invention. There should be a commercial market for such systems that provide an early warning to abort a start and thereby avoid serious damage to a turbine engine.

In addition, systems in accordance with the present invention provide an unmistakable tactile warning to avoid "hot-starts". Further, systems in accordance with a preferred embodiment of the invention also include tactile warning means for avoiding over stressed conditions such as output temperature, torque and engine speed during flight operations. Such systems include a single multi-function tactile warning device for warning a pilot of dangerous conditions.

BRIEF SUMMARY OF THE INVENTION

In essence, the present invention contemplates a "hot-start" avoidance system for a helicopter of the type having a turbine engine. The system includes a collective and a tactile warning device operatively connected to the collective. The system also includes a data storage means such as a micro processor and an input device such as a keyboard for entering or inputting a safe temperature profile for the startup of a turbine engine. Means such as a thermocouple for measuring the actual turbine output temperature during the startup of a helicopter turbine engine are also provided. The system also includes means for activating the tactile warning device such as an electrical signal when the actual engine temperature during startup falls outside of a safe temperature profile. In one embodiment of the invention, an actual temperature profile is plotted by the micro processor and if a preselected profile is exceeded a warning will be given to the pilot to abort the startup of a turbine engine.

In a preferred embodiment of the invention an over stress warning system includes a "hot-start" avoidance system as described above. In addition, the system in accordance with the preferred embodiment of the invention includes means for activating the tactile warning system during flight operations when an over stress condition such as excessive torque, excessive temperature or engine speed are encountered. In this way, a pilot is warned to take corrective action before serious consequences are encountered.

In a modification of the preferred embodiment of the invention, the tactile warning system during flight operations is provided at a first frequency or perhaps a first amplitude at a first preselected level, as for example, a first critical parameter or dangerous condition is approached. Then, the frequency or amplitude is increased when a second preselected level or a critical parameter is exceeded.

The invention will now be described in connection with the accompanying drawings wherein like reference numbers have been used to describe like parts.

DETAILED DESCRIPTION OF THE PREFERRED EMBODIMENTS OF THE INVENTION

Figure 1:
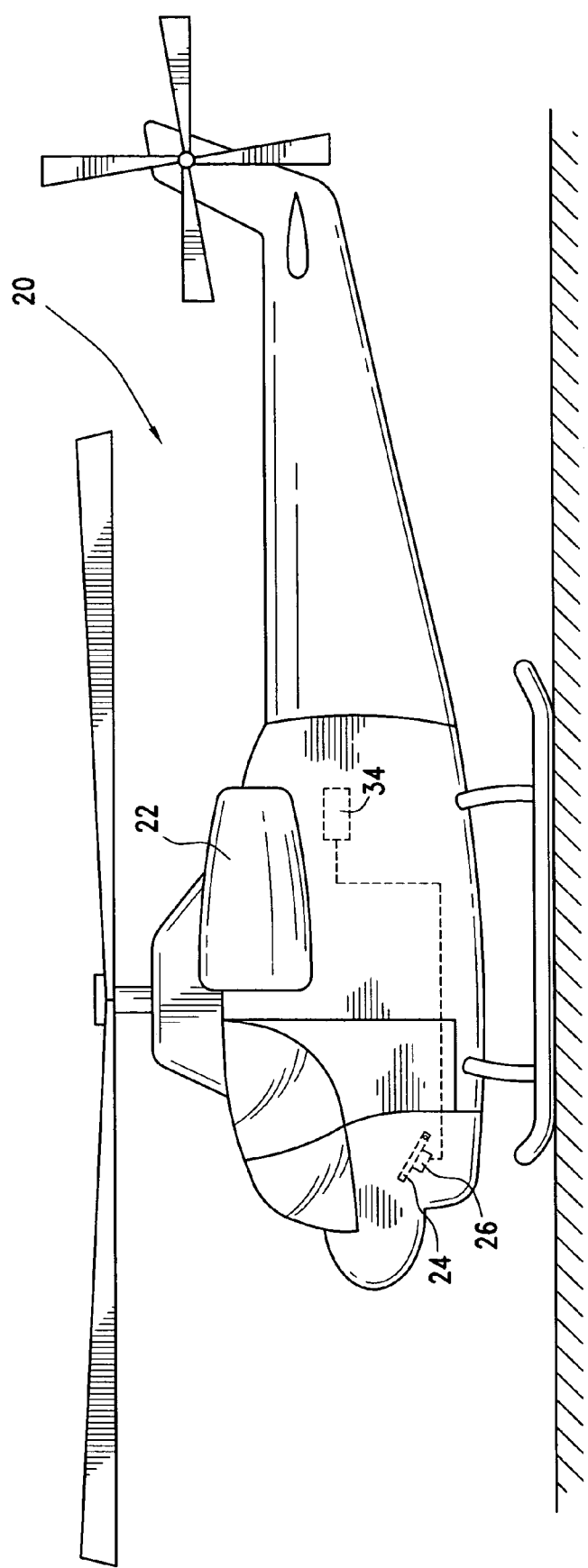
FIG. 1 is a side elevational view which shows a helicopter having an over-stress warning system in accordance with the present invention.

In FIG. 1, a helicopter 20 having a turbine engine 22 mounted therein and an over stress warning system is shown. As shown in FIG. 1, the over stress warning system includes a collective 24 and a tactile warning device 26 attached thereto. A conventional sensor 52 (FIG. 2) such as a thermocouple is provided for measuring the turbine outlet temperature of a helicopter turbine engine. The sensor 52 is connected to a micro processor 34. The micro processor is connected to a tactile warning device 26 such as a stick shaker which is attached to the helicopter collective 24.

Figure 2:
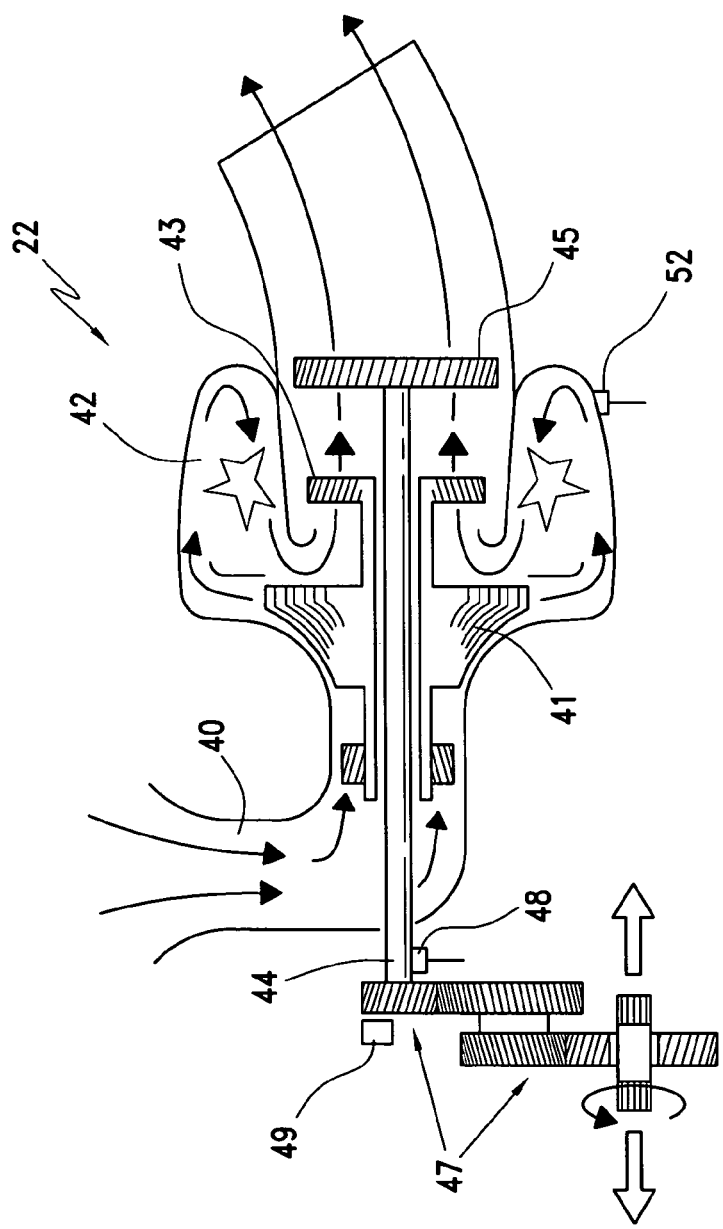
FIG. 2 is a schematic illustration of a helicopter turbine engine for use in practicing the present invention.

FIG. 2 illustrates a turbine engine 22 of the type typically used for powering helicopters. As shown, the engine also includes a turbine outlet temperature sensor 52 which may be of any conventional design. Air is supplied to the turbine engine 22 through an inlet duct 40 and is compressed in a compressor section 41. Fuel is supplied to the combustion chamber 42 which extends peripherally around the engine. The expanded gasses are supplied to a turbine portion 43 which drives the compressor 41 and then to power the turbine 45 which drives an output shaft 44 to power the helicopter through a suitable gear train 47. A torque takeoff 48 of conventional design is provided for measuring actual torque during flight operations. A tachometer 49 is also provided for indicating engine speed. In addition, a temperature sensor 52 or thermocouple is provided for sensing the turbine output temperatures.

Figure 3:
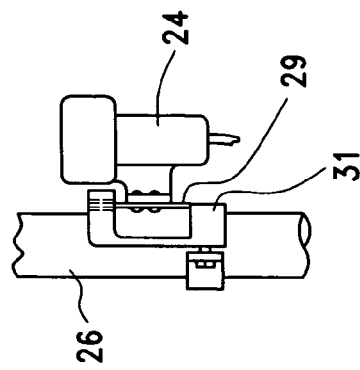
FIG. 3 is a schematic illustration of a helicopter collective having a tactile warning device attached thereto.

FIG. 3 illustrates a shaker 24 which is attached to the collector 26. In this type of installation, the shaker 24 is attached to a leaf spring 29 which in turn is attached at one end to a clamp 31. It should be recognized that the shaker 24 may provide a constant frequency or amplitude of vibration once it has been actuated or the frequency and/or amplitude of the vibration may increase as the turbine engine output temperature reaches its maximum operating temperature. The increase may either be continuously or may be in discreet steps reaching a maximum at the point for aborting the start.

Figure 4:
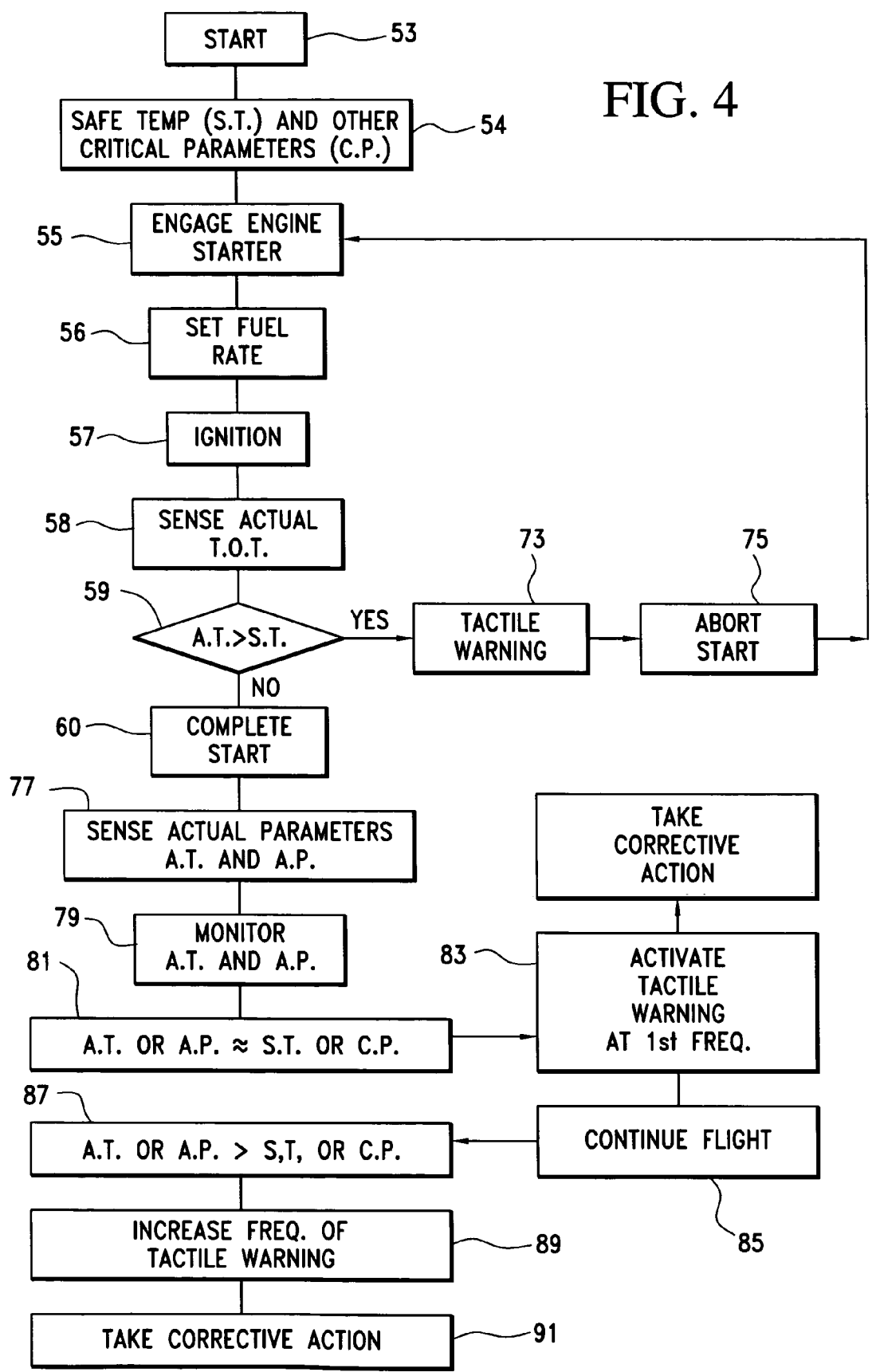
FIG. 4 is a block diagram which illustrates one embodiment of the invention.

FIG. 4 illustrates a method for avoiding "hot-starts" in accordance with one embodiment of the invention. In conventional practice, the turbine outlet temperature is monitored to avoid a "hot-start" which could seriously damage an engine. For example, a startup procedure for one specific engine is aborted if either the 927° C. maximum or the 810° C. to 927° C. maximum ten second transient limitation is about to be exceeded. Under such circumstances, a pilot depresses the engine idle release button, closes the throttle and continues to motor the starter until the turbine outlet temperature falls below 810° C.

In accordance with the present invention, a start 53 is initiated as provided in an FAA approved procedure. However, before initiating a startup procedure, a tactile device is attached to the collective and a data storage device is provided. Then in step 41 a safe temperature, safe temperature profile and critical conditions are inputted. A temperature profile may be inputted so that immediate action can be taken as soon as the actual temperature falls outside of the profile. It is also believed that the use of a temperature profile may be a more effective parameter which allows remedial action to be implemented earlier as the actual temperature approaches a dangerous condition.

After completing the FAA mandated pre-start check list, the engine starter motor is engaged in step 55, the fuel rate set in step 56 and ignition of the fuel in step 57. In step 58 the turbine outlet temperature is sensed and in step 59 the actual temperature is compared to the safe starting temperature or safe temperature profile. Then if the actual temperature does not exceed the safe temperature or fall outside of the temperature profile, the turbine engine is started as illustrated by step 60. However, if the actual temperature is greater then the safe temperature or falls outside of the temperature profile, a tactile warning is given in step 73 and the start is aborted in step 75. After aborting the start, the engine is allowed to cool. Then the engine start procedure is begun again in step 55 and a restart procedure is initiated.

After completing a start, actual conditions are sensed in step 77 and monitored in step 79. Then in step 81 the actual conditions are compared to the critical parameters and as long as the actual conditions do not approach the critical parameters, the actual conditions continued to be monitored as indicated by step 79. As contemplated by this embodiment of the invention, the input of the critical parameters includes the actual critical parameters including turbine output temperature during flight which require immediate action by the pilot. As well as a second level of parameters which are slightly less then the critical parameters are also provided. Then when the actual temperature or other actual parameter approach the critical parameters or critical temperature i.e. approximately equal to the critical parameters in step 81, the tactile warning device is acted at a first or relatively low frequency or amplitude in step 83.

The first level of warning is an indication to the pilot that he is approaching the critical parameters and should seriously consider taking corrective action. However, if the pilot continues to fly due to an emergency condition or the like without taking corrective action as indicated by step 85, the actual temperature and actual parameter are continuously compared until they exceed a second level or critical parameter as indicated by step 87. At this point the frequency of the tactile warning is increased in step 89 to warn the pilot to immediately take corrective action in step 91.

The increase in frequency may be accomplished by any conventional means as will be well understood by a person of ordinary skill in the art. For example, it may be accomplished in a similar manner to that disclosed in my earlier U.S. Pat. No. 6,002,348 which is included herein in its entirety be reference. Similarly, the frequency can be continuously increased as a dangerous condition is approached.

Figure 5:
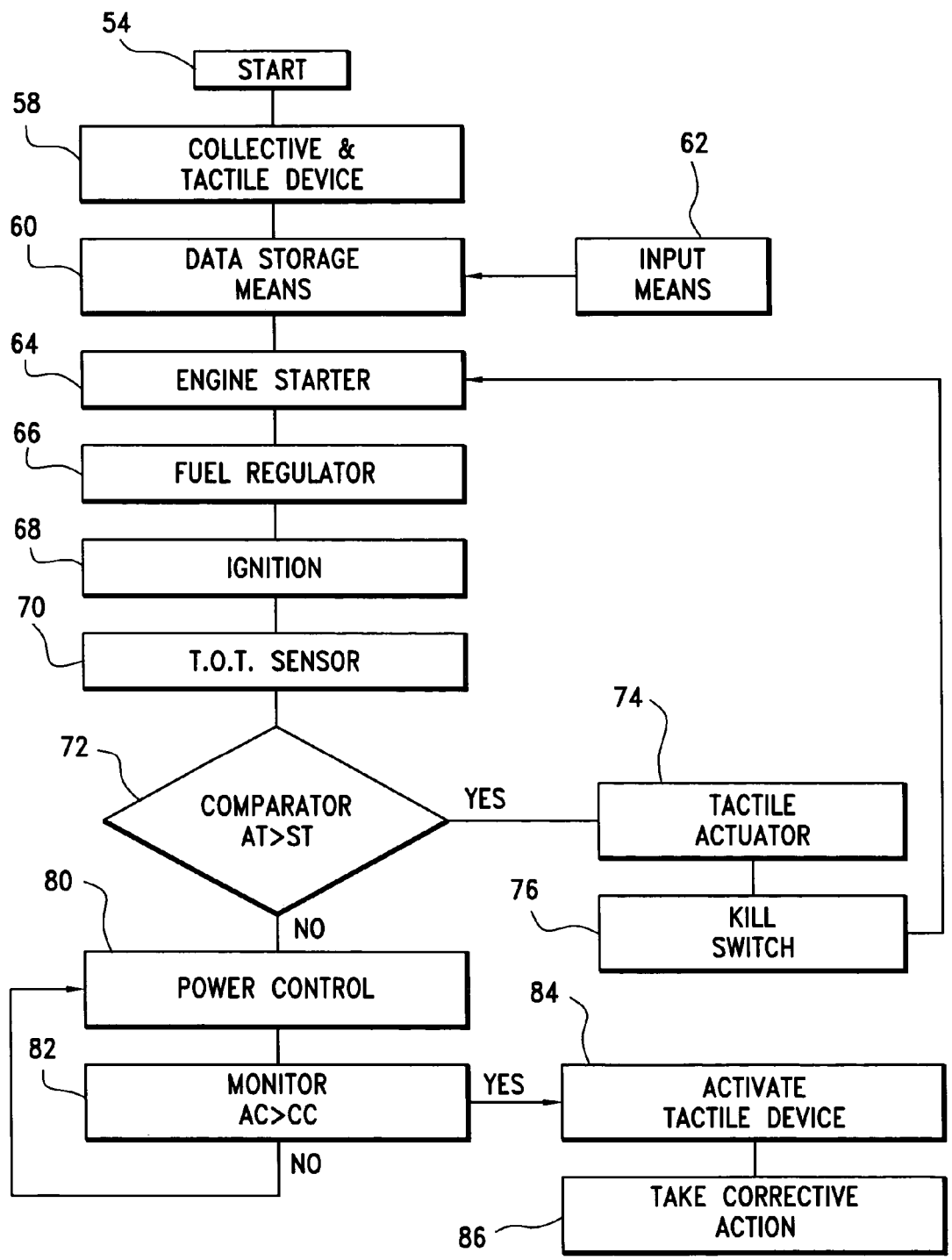
FIG. 5 is a block diagram which illustrates another embodiment of the invention.

A further embodiment of the invention is illustrated in FIG. 5 wherein means for starting a helicopter turbine engine is provided as indicated by the number 54. Also provided are a collective and a tactile device 58 attached to the collective for providing a tactile signal when a critical parameter is about to be exceeded. The device also includes data storage means 60 such as a computer and input means 62 such as a keyboard for inputting the critical parameters into the data storage means 60. Means for starting the engine such as an engine crank 64 are used to start the engine while a fuel regulator 66 regulates the amount of fuel being provided to the turbine engine. Means for ignition 68 are used to ignite the fuel while a turbine outlet temperature sensor 70 is used to indicate the turbine output temperature. Comparater means 72 such as a computer compares the actual temperature from the temperature output temperature 70 with the safe temperature. Then, when the actual temperature exceeds the safe temperature the tactile actuator is actuated as indicated by the box 74. A kill switch 76 is provided so that the pilot can abort the start under such conditions. However, if the comparator 72 indicates that the actual temperature does not exceed the safe temperature the engine is started and the power controlled by a power control means 80. After the start of the engine and regulation of the power, the actual conditions of the engine are monitored by monitoring means 82 until such time that an actual condition exceeds a critical conditions. When an actual condition exceeds a critical condition, the tactile device is activated as indicated by 84 and corrective action is taken by the pilot as indicated by 86.

Figure 6:
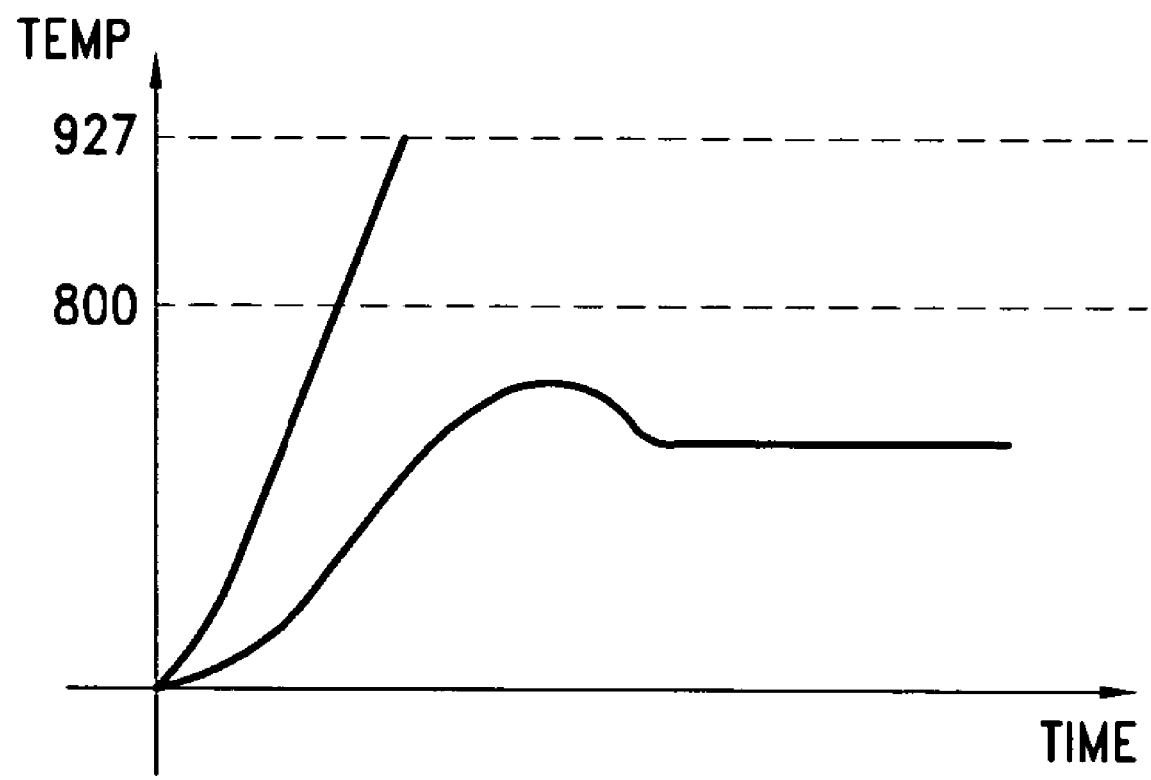
FIG. 6 is a schematic illustration of a normal temperature profile during a safe startup of a helicopter turbine engine and a temperature profile for a "hot-start.

FIG. 6 is a schematic illustration of a temperature profile i.e., temperature versus time for a normal startup versus a temperature profile for a "hot-start". For example, the temperature profile shown for a normal start up has a slope of about 30° C./second while a "hot-start" is shown with a slope of about 90° C./second.

While the invention has been described in connection with its accompanying drawings, changes and modifications may be made therein without departing from the scope of the appended claims.

What is claimed is:

1. A helicopter turbine engine over stress warning system comprising:
 a helicopter;
 a helicopter turbine engine mounted in said helicopter;
 a collective and a tactile warning device including a collective shaker operatively connected to said collective;
 data storage means and means for inputting a safe turbine output temperature profile for startup of the helicopter turbine engine and other safe operating parameters during flight of the helicopter;
 means for measuring actual turbine output temperature during startup of the turbine engine and for detecting actual turbine output temperatures and other actual parameters during flight of the helicopter;
 means to activate said tactile warning device when the actual turbine output temperature during startup falls outside of the safe turbine output temperature profile during startup and when the safe turbine output temperature or other safe operating parameters are exceeded during flight operations to thereby warn a pilot to take corrective action;
 means for increasing the magnitude of the tactile warning when the turbine output temperature reaches its maximum operating temperature;
 means for determining an impending dangerous condition associated with the other safe operating parameters; and
 means for increasing the frequency of the tactile warning in response to the impending dangerous condition when the impending dangerous condition is imminent.

* * * * *